US012795779B2

(12) United States Patent
Li et al.

(10) Patent No.: US 12,795,779 B2
(45) Date of Patent: Nov. 10, 2026

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Haitao Li, Dongguan (CN); Yi Hu, Dongguan (CN); Xinlei Yu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 308 days.

(21) Appl. No.: 18/598,650

(22) Filed: Mar. 7, 2024

(65) Prior Publication Data

US 2024/0267992 A1 Aug. 8, 2024

Related U.S. Application Data

(63) Continuation of application No. PCT/CN2021/122626, filed on Oct. 8, 2021.

(51) Int. Cl.
*H04W 76/38* (2018.01)
*H04W 76/27* (2018.01)
*H04W 76/30* (2018.01)

(52) U.S. Cl.
CPC .......... *H04W 76/38* (2018.02); *H04W 76/27* (2018.02)

(58) Field of Classification Search
CPC ...... H04W 76/38; H04W 76/27; H04W 76/30
USPC .......................................................... 370/328
See application file for complete search history.

(56) References Cited

U.S. PATENT DOCUMENTS

2012/0208527 A1 8/2012 Park
2022/0210632 A1* 6/2022 Tseng .................... H04W 8/183
2022/0418031 A1* 12/2022 Yang ..................... H04W 76/19
2023/0058517 A1* 2/2023 Nakarmi ............ H04W 12/082
(Continued)

FOREIGN PATENT DOCUMENTS

CN 108377520 A 8/2018
WO 2019191992 A1 10/2019
(Continued)

OTHER PUBLICATIONS

International Search Report in the international application No. PCT/CN2021/122626, mailed on Jun. 29, 2022.
(Continued)

*Primary Examiner* — Xuan Lu
(74) *Attorney, Agent, or Firm* — Ladas & Parry, LLP

(57) ABSTRACT

A wireless communication method, a terminal device, and a network device are provided. For RRC connection release, time information is introduced, and the terminal device can release an RRC connection according to the time information, such that signaling overhead caused by sending an RRC connection release message by the network device can be avoided, and the data transmission efficiency can also be improved. The wireless communication method includes: the terminal device receives configuration information sent by a serving cell, wherein the configuration information comprises the time information; and the terminal device releases the RRC connection according to the time information.

17 Claims, 5 Drawing Sheets

200

(56) References Cited

U.S. PATENT DOCUMENTS

| | | | | |
|---|---|---|---|---|
| 2023/0284146 | A1* | 9/2023 | Zhou | H04W 52/241 |
| 2024/0179582 | A1* | 5/2024 | Li | H04W 48/12 |

FOREIGN PATENT DOCUMENTS

| | | | |
|---|---|---|---|
| WO | 2021095825 | A1 | 5/2021 |
| WO | 2023056604 | A1 | 4/2023 |

OTHER PUBLICATIONS

Written Opinion of the International Search Authority in the international application No. PCT/CN2021/122626, mailed on Jun. 29, 2022.

MediaTek Inc. et al, "WID on NB-IoT/eMTC support for NTN", 3GPP TSG RAN Meeting #92-e RP-211601, Electronic Meeting, Jun. 14-18, 2021, the whole document.

* cited by examiner

WIRELESS COMMUNICATION METHOD, TERMINAL DEVICE, AND NETWORK DEVICE

CROSS-REFERENCE TO RELATED APPLICATION

This is a continuation of International Application No. PCT/CN2021/122626 filed on Oct. 8, 2021, the disclosure of which is hereby incorporated by reference in its entirety.

BACKGROUND

In a New Radio (NR) system, a network/base station releases a terminal device to be in a Radio Resource Control (RRC) idle state through a RRC connection release message. For a scenario with a poor coverage, such as the Narrow Band Internet of Things (NB-IoT) or Enhanced Machine Type Communication (eMTC), transmission of one RRC connection release message will take about 2 s, for example, for 2048 times of retransmissions of Physical Downlink Shared Channel (PDSCH), and if 2048 times of retransmissions of Physical Downlink Control Channel (PDCCH) are added, then such transmission will take about 4 s. This is a big overhead for a Low Earth Orbit (LEO) satellite network. For example, for some LEO satellites, the overhead time is about 6 s, such connection release message may occupy too much available data transmission time under the RRC connected state and affect transmission efficiency.

SUMMARY

Embodiments of the present disclosure relate to the field of communications, and provide methods for wireless communication, a terminal device and a network device. Time information is introduced for RRC connection release, and the terminal device may release the RRC connection according to the time information, thereby avoiding signaling overhead caused by sending the RRC connection release message by the network device and improving data transmission efficiency.

In a first aspect, there is provided a method for wireless communication including the following operations.

A terminal device receives configuration information sent by a serving cell. The configuration information includes time information.

The terminal device releases an RRC connection according to the time information.

In a second aspect, there is provided a method for wireless communication including the following operations.

A network device sends configuration information to a terminal device. The configuration information includes time information used for the terminal device to release an RRC connection.

In a third aspect, there is provided a terminal device configured to perform the method in the first aspect.

In particular, the terminal device includes functional modules configured to perform the method in the first aspect.

In a fourth aspect, there is provided a network device configured to perform the method in the second aspect.

In particular, the network device includes a functional module configured to perform the method in the second aspect.

In a fifth aspect, there is provided a terminal device including a processor and a memory. The memory is configured to store a computer program, and the processor is configured to invoke and run the computer program stored in the memory to perform the method in the first aspect.

In a sixth aspect, there is provided a network device including a processor and a memory. The memory is configured to store a computer program, and the processor is configured to invoke and run the computer program stored in the memory to perform the method in the second aspect.

In a seventh aspect, there is provided an apparatus configured to implement the method in any one of the first aspect or the second aspect.

In particular, the apparatus includes a processor. The processor is configured to invoke and run a computer program from a memory, to enable a device installed with the apparatus to perform the method in any one of the first aspect or the second aspect.

In an eighth aspect, there is provided a computer-readable storage medium configured to store a computer program. The computer program causes a computer to perform the method in any one of the first aspect or the second aspect.

In a ninth aspect, there is provided a computer program product including computer program instructions. The computer program instructions cause a computer to perform the method in any one of the first aspect or the second aspect.

In a tenth aspect, there is provided a computer program. The computer program, when run on a computer, causes the computer to perform the method in any one of the first aspect or the second aspect.

Through the technical solutions, the terminal device may release the RRC connection according to the time information, thereby avoiding the signaling overhead caused by sending the RRC connection release message by the network device and improving the data transmission efficiency.

DETAILED DESCRIPTION

Figure 1:
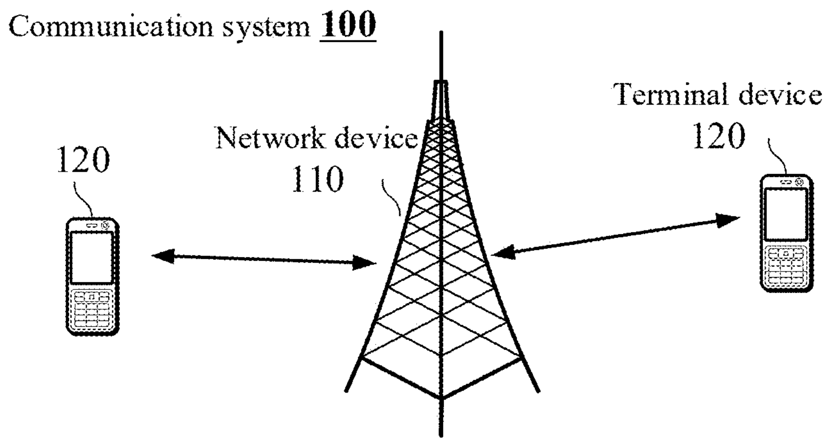
FIG. 1 is a schematic diagram of a communication system architecture to which an embodiment of the present disclosure is applied.

The technical solutions of the embodiments of the present disclosure will be described in conjunction with the accompanying drawings in the embodiments of the present disclosure. It is apparent that the described embodiments are only part of the embodiments of the present disclosure, not all the embodiments. All other embodiments obtained by those of ordinary skill in the art with respect to the embodiments of the present disclosure without creative efforts shall fall within the scope of protection of the present disclosure.

The technical solutions in the embodiments of the present disclosure may be applied to various communication systems, such as: a Global System Of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an Advanced long term evolution (LTE-A) system, a New Radio (NR) system, an evolution system for NR system, a LTE-based access to unlicensed spectrum (LTE-U) system, a NR-based access to unlicensed spectrum (NR-U) system, a Non-Terrestrial Networks (NTN) system, a Universal Mobile Telecommunication System (UMTS), a Wireless Local Area Network (WLAN), internet of things (IoT), a Wireless Fidelity (Wi-Fi), a 5th-generation (5G) system or other communication systems.

Generally, connections supported by a conventional communication system are limited in number and also easy to implement. However, with the development of communication technologies, a mobile communication system will not only support conventional communication but also support, for example, Device to Device (D2D) communication, Machine to Machine (M2M) communication, Machine Type Communication (MTC), Vehicle to Vehicle (V2V) communication, or Vehicle to everything (V2X) communication. The embodiments of the present disclosure may also be applied to these communication systems.

In some embodiments, the communication system in the embodiments of the present disclosure may be applied to a Carrier Aggregation (CA) scenario, a Dual Connectivity (DC) scenario, and a Standalone (SA) network deployment scenario.

In some embodiments, the communication system in the embodiments of the present disclosure may be applied to an unlicensed spectrum, and the unlicensed spectrum may also be considered as a shared spectrum. Alternatively, the communication system in the embodiments of the present disclosure may also be applied to a licensed spectrum, and the licensed spectrum may also be considered as a non-shared spectrum.

The embodiments of the present disclosure are described in combination with a network device and a terminal device. The terminal device may also be referred to as User Equipment (UE), an access terminal, a user unit, a user station, a mobile station, a mobile radio station, a remote station, a remote terminal, a mobile device, a user terminal, a terminal, a wireless communication device, a user agent or a user device, etc.

The terminal device may be a station (ST) in the WLAN, or may be a cell phone, a cordless phone, a Session Initiation Protocol (SIP) phone, a Wireless Local Loop (WLL) ST, a Personal Digital Assistant (PDA), a handheld device with a wireless communication function, a computing device, another processing device connected to a wireless modem, a vehicle-mounted device, a wearable device, a terminal device in a next-generation communication system, for example, an NR network, a terminal device in a future evolved Public Land Mobile Network (PLMN), or the like.

In the embodiments of the present disclosure, the terminal device may be deployed on land, including indoor or outdoor, handheld, wearable or onboard, or may be deployed on the water surface (such as a ship, or the like), or may be deployed in the air (such as an airplane, a balloon, a satellite, or the like).

In the embodiments of the present disclosure, the terminal device may be a mobile phone, a pad, a computer with a wireless transceiver function, a virtual reality (VR) terminal device, an augmented reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, a wireless terminal device in smart home, vehicle-mounted communication device, wireless communication chip/Application Specific Integrated Circuit (ASIC)/System on Chip (SoC), etc.

By way of example and not limitation, in the embodiments of the present disclosure, the terminal device may also be a wearable device. The wearable device, also referred to as a wearable intelligent device, is a generic term of wearable devices obtained by performing intelligent design and development on daily wearing products by using the wearable technology, such as glasses, gloves, watches, clothes, and shoes. The wearable device is a portable device directly worn or integrated to clothes or accessory of a user. The wearable device not only is a hardware device but also realizes powerful functions by software support, data interaction, and cloud interaction. Generalized wearable intelligent devices include full-featured, large size and complete or partial functions realized without relying on smart phones, such as smart watches or smart glasses, and includes only a certain application function, which is necessary to be used in conjunction with other devices such as a smart phone, such as various smart bracelets and smart jewelry for monitoring physical signs.

In the embodiments of the present disclosure, the network device may be a device configured to communicate with a mobile device. The network device may be an Access Point (AP) in the WLAN, a Base Transceiver Station (BTS) in the GSM or CDMA, or may be a NodeB (NB) in WCDMA, or may be an Evolutional Node B (eNB or eNodeB) in the LTE, or a relay ST or AP, or a vehicle-mounted device, a wearable device, a network device or a base station (a gNB) in the NR network, a network device in the future evolved PLMN, or a network device in the NTN network, etc.

By way of example and not limitation, in the embodiments of the present disclosure, the network device may have mobile characteristics. For example, the network device may be a mobile device. In some embodiments, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, and the like. In some embodiments, the network device may also be a base station arranged on land, water or another place.

In the embodiments of the present disclosure, the network device may provide services for a cell, and the terminal device communicates with the network device through a transmission resource (for example, a frequency-domain resource or a spectrum resource) for the cell. The cell may be a cell corresponding to the network device (for example, a base ST). The cell may belong to a macro base station or a base station corresponding to a small cell. The small cell may include a metro cell, micro cell, pico cell, femto cell, etc. These small cells have the characteristics of small coverage and low transmission power, and are suitable for providing high-speed data transmission services.

Exemplarily, the communication system 100 to which the embodiments of the present disclosure are applied is illustrated in FIG. 1. The communication system 100 may include a network device 110 that communicates with a terminal device 120 (or referred to as a communication terminal, or a terminal). The network device 110 may provide communication coverage for a particular geographic area and may communicate with terminal devices located within the coverage.

FIG. 1 exemplarily illustrates one network device and two terminal devices. In some embodiments, the communication system 100 may include multiple network devices, and other numbers of terminal devices may be included within the coverage of each network device, which is not limited by the embodiments of the present disclosure.

In some embodiments, the communication system 100 may also include other network entities, such as, a network controller, a mobility management entity, etc., which are not limited by the embodiments of the present disclosure.

It is to be understood that a device having a communication function in the network or system in the embodiments of the present disclosure may be referred to as a communication device. The communication system 100 illustrated in FIG. 1 is taken as an example, the communication device may include a network device 110 and a terminal device 120 that both have the communication function, and the network device 110 and the terminal device 120 may be the devices described above, which will not be described herein. The communication device may also include other devices in the communication system 100, such as, a network controller, a mobility management entity and other network entities, which are not limited in the embodiments of the present disclosure.

It should be understood that the terms "system" and "network" may usually be exchanged herein. The term "and/or" in the disclosure is only an association relationship describing associated objects, for example, represents that previous and next associated objects may have three relationships. For example, A and/or B may represent three conditions: i.e., independent existence of A, existence of both A and B, and independent existence of B. The character "/" in the disclosure usually represents that previous and next associated objects form an "or" relationship.

Terms used in the embodiments of the present disclosure are used only for explanation of specific embodiments of the present disclosure and are not intended to limit the disclosure. Terms "first", "second", "third", "fourth", etc. in the drawings, description and claims of the present disclosure are used to distinguish different objects, and are not used to describe a particular order. Furthermore, the terms "including" and "having" and any variations thereof are intended to cover non-exclusive inclusion.

It should be understood that the term "indication" mentioned in the embodiments of the present disclosure may be direct indication, or indirect indication, or indicate that there is an association relationship. For example, A indicating B may indicate that A directly indicates B, for example, B may be acquired through A, or indicate that A indirectly indicates B, for example, A indicates C, and B may be acquired through C, or indicate that there is an association relationship between A and B.

In the description of embodiments of the present disclosure, the term "correspondence" may indicate that there is a direct correspondence or indirect correspondence between the two elements, or may indicate that there is an association relationship between the two elements, or may indicate a relationship between indicating and being indicated, or between configuring and being configured.

In the embodiments of the present disclosure, the term "predefined" or "pre-configured" may be implemented by pre-storing corresponding codes, tables, or other manners for indicating relevant information in devices (e.g., including a terminal device and a network device). The specific implementation is not limited in the present disclosure. For example, "predefined" may refer to those defined in a protocol.

In the embodiments of the present disclosure, the term "protocol" may refer to a standard protocol in the communication field, which may include, for example, an LTE protocol, NR protocol and relevant protocol applied in the future communication system, which is not limited in the present disclosure.

In order to facilitate understanding of the technical solutions of the embodiments of the present disclosure, the technical solutions of the present disclosure will be described in detail by specific embodiments below. The following relevant technology as optional solutions may be combined with the technical solutions of the embodiments in any way, and shall fall within the scope of protection of the disclosure. The embodiments of the present disclosure include at least some of the following.

At present, with the pursuit of speed, latency, high-speed mobility and energy efficiency, as well as the diversity and complexity of services in future life, a 5G communication network is introduced. The main application scenarios of the 5G are Enhanced Mobile Broadband (eMBB), Ultra-Reliable Low Latency Communication (URLLC), and massive Machine-Type Communications (mMTC).

The eMBB still aims to acquiring multimedia content, services and data by users, and its demand is growing rapidly. On the other hand, since the eMBB may be deployed in different scenarios, such as indoor, urban, rural scenarios, etc., and the differences in capabilities and requirements for the different scenarios are relatively large, it cannot be generalized and must be analyzed in detail with reference to specific deployment scenarios. Typical applications of URLLC include: industrial automation, power automation, telemedicine operation (surgery), traffic safety and so on. Typical characteristics of mMTC include: high connection density, small data size, latency-insensitive services, low cost and long service life of modules, and so on.

The NR may also be deployed independently. In the 5G network environment, a new RRC state, i.e., RRC inactive (RRC_INACTIVE) state is defined for the purpose of reducing air interface signaling, quickly resuming wireless connection and quickly resuming data traffic. The RRC_INACTIVE state is different from the RRC idle (RRC_IDLE) state and the RRC active (RRC_ACTIVE) state.

In the RRC_IDLE state, the mobility is terminal-based cell selection/reselection, paging is initiated by a Core Network (CN), a paging area is configured by the CN, and terminal Access Stratum (AS) context does not exist at the base station side. There is no RRC connection.

In the RRC_CONNECTED state, there is an RRC connection, and the base station and the terminal both have the terminal AS context. The network side knows that the location of the terminal is in a specific cell level. Mobility is controlled by the network side. Unicast data may be transmitted between the terminal and the base station.

In the RRC_INACTIVE state, mobility is terminal-based cell selection/reselection, there is a connection between a core network and a NR (CN-NR), there is terminal AS context on a certain base station, paging is triggered by a Radio Access Network (RAN), an RAN-based paging area is managed by the RAN, and the network side knows that the location of the terminal is in a RAN-based paging area level.

Figure 2:
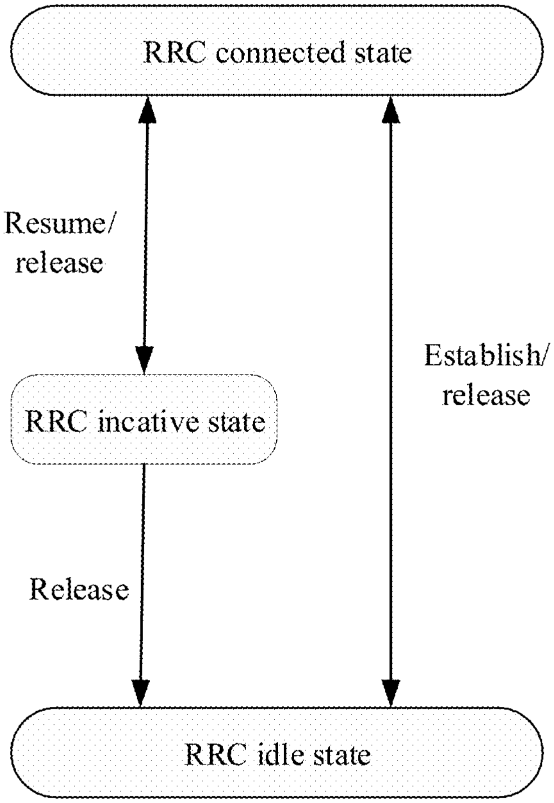
FIG. 2 is a schematic diagram of RRC state switching provided by the present disclosure.

For example, the network side may control the terminal to switch the states, as illustrated in FIG. 2.

In some embodiments, in a case that the RRC connection is in the RRC inactive state, the terminal autonomously returns to the RRC idle state when the following cases occur:

a case where the terminal receives a paging message initiated by the CN; or a case where a timer T319 is started when the terminal initiates an RRC resume request and the timer T319 expires; or a case where the authentication of message 4 (MSG 4) integrity protection in four-step random access fails;

a case where the cell is re-selected to another Radio Access Technology (RAT);

a case where a state of camping on any cell is entered.

In some embodiments, the RRC state switching based on control of the network side includes the following.

The UE may be switched from the RRC_IDLE state into the RRC_CONNECTED state through an RRC connection establishment process (including 3 steps: signaling radio bearers (SRB)0-SRB1-SRB1).

The UE in the RRC_CONNECTED state may be switched to be in the RRC_IDLE state or the RRC_INACTIVE state through an RRC release process (including 1 step: SRB1).

The UE may be switched from the RRC_INACTIVE state into the RRC_CONNECTED state through an RRC resume process (including 3 steps: SRB0-SRB1-SRB1).

The UE may be switched from the RRC_INACTIVE state into the RRC_INACTIVE state or the RRC_IDLE state through the RRC resume process (including 2 steps: SRB0-SRB1).

The UE may be switched from the RRC_INACTIVE state into the RRC_INACTIVE state through the RRC resume process (including 2 steps: SRB0-SRB0).

In some embodiments, the RRC state switching based on a dataInactivityTimer is as follows.

The dataInactivityTimer is used for controlling inactive operations of data. This parameter is configured under the RRC_CONNECTED state in unit of second (s). Start of the dataInactivityTimer is controlled by the Media Access Control (MAC) layer. When the MAC sends and receives any Dedicated Transmission Channel (DTCH), dedicated control channel (DCCH), common control channel (CCCH) (downlink only), the dataInactivityTimer will be started or restarted. If the dataInactivityTimer expires, the MAC layer notifies the RRC layer that the dataInactivityTimer expires.

In order to better understand the embodiments of the present disclosure, a Non-Terrestrial Network (NTN) related to the present disclosure is explained.

The NTN generally provides communication services to terrestrial users by means of satellite communication. Compared with terrestrial cellular network communication, the satellite communication has many unique advantages. Firstly, the satellite communication is not restricted by users' geographical areas. For example, a general land communication cannot cover areas such as oceans, mountains, deserts, or the like where communication devices cannot be installed or areas where communication coverage is not made due to sparse population. However, for the satellite communication, since a satellite may cover a large ground area, and the satellite may move on an orbit around the earth, every corner of the earth may be theoretically covered by the satellite communication. Secondly, the satellite communication has a great social value. The satellite communication may cover remote mountainous regions and poor and backward countries or regions at a lower cost, so that people in these regions enjoy advanced voice communications and mobile Internet technologies, which is beneficial to narrow digital divide with developed regions and promote development of these regions. Thirdly, the satellite communication has a long distance, and communication cost is not increased significantly as the communication distance increases. Finally, the satellite communication has high stability and is not restricted by natural disasters.

Communication satellites are divided into Low-Earth Orbit (LEO) satellites, Medium-Earth Orbit (MEO) satellites, Geostationary Earth Orbit (GEO) satellites and High Elliptical Orbit (HEO) satellites according to different orbital altitudes.

An altitude range of the LEO satellite may be 500 km to 1,500 km, and correspondingly, an orbital period of the LEO satellite may be about 1.5 hours to 2 hours, a signal propagation delay of single-hop communication between users may be usually less than 20 milliseconds (ms), and a maximum visibility time of the satellite may be 20 minutes. The LEO satellite has a short signal propagation distance and a small link loss, and has a low transmission power requirement to the user terminal.

An altitude range of the GEO is 35,786 km, and the rotation period around the Earth is 24 hours. The signal propagation delay of single-hop communication between users may be generally 250 ms.

In order to ensure the coverage of the satellite and improve the system capacity of the entire satellite communication system, the satellite covers the ground with multiple beams. One satellite can form tens or even hundreds of beams to cover the ground; and one satellite beam can cover the ground area with a diameter of tens to hundreds of kilometers (km).

Figure 3:
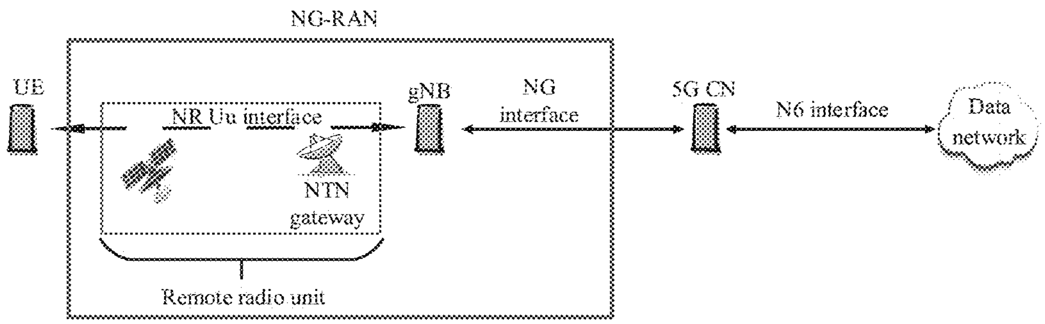
FIG. 3 is a schematic diagram of a transparent payload satellite network architecture provided by the present disclosure.
Figure 4:
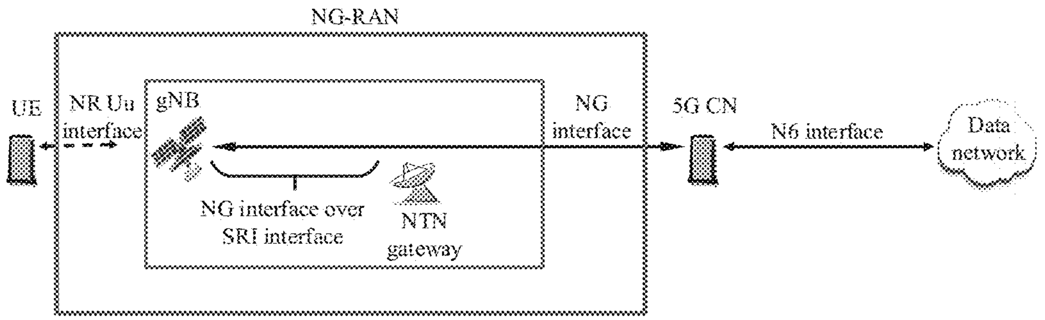
FIG. 4 is a schematic diagram of a regenerative payload satellite network architecture provided by the present disclosure.

In some embodiments, there are two kinds of satellites, one being a transparent payload satellite and the other being a regenerative payload satellite. The network architecture of the transparent payload satellite may be illustrated in FIG. 3, and the network architecture of the regenerative payload satellite may be illustrated in FIG. 4. A feeder link is a wireless link between a satellite and an NTN gateway (usually located on the ground).

In order to better understand the embodiments of the present disclosure, the eMTC and NB-IoT related to the present disclosure are described.

An eMTC terminal or NB-IoT terminal is connected to the eNB, and the eNB may be connected to an Evolved Packet Core (EPC) or a 5G Core Network (5GC). When the eNB is connected to the 5GC, the eMTC terminal supports the RRC idle state and the RRC inactive state, and the NB-IoT terminal supports only the RRC idle state.

In order to better understand the embodiments of the present disclosure, physical channels of the eMTC related to the present disclosure are described.

MTC Physical Downlink Control Channel (MPDCCH) is used for sending scheduling information. A terminal receives control information based on a Demodulation Reference Signal (DMRS) and supports functions such as control information pre-coding and beamforming. One Enhanced Physical Downlink Control Channel (EPDCCH) transmits one or more Enhanced Control Channel Elements (ECCEs) and has an aggregation level of $\{1, 2, 4, 8, 16, 32\}$. Each ECCE includes multiple Enhanced Resource Element Groups (EREGs). The maximum number of MPDCCH repetitions $R_{max}$ may be configured, and has a value range of {1, 2, 4, 8, 16, 32, 64, 128, 256}.

The eMTC PDSCH is basically the same as LTE PDSCH, but additionally has the repetition and inter-narrowband frequency-hopping for improving the channel coverage capability and interference averaging of the Physical Downlink Shared Channel (PDSCH). The eMTC terminal may work in a Mode A and a Mode B. In the Mode A, the maximum number of uplink and downlink Hybrid Automatic Repeat reQuest (HARQ) processes is 8, and in this mode, the number of PDSCH repetitions is {1, 4, 16, 32}. In the Mode B, the maximum number of uplink and downlink HARQ processes is 2, and in this mode, the number of PDSCH repetitions is {4, 16, 64, 128, 256, 512, 1024, 2048}.

The Physical Uplink Control Channel (PUCCH) has a frequency-domain resource format same as that of the LTE, and supports frequency-hopping and repeated transmissions. The Mode A supports sending of an HARQ Acknowledge feedback (HARQ-ACK) or an HARQ Negative Acknowledgment feedback (HARQ-NACK), a Scheduling Request (SR) and Channel State Information (CSI) on PUCCH. That is to say, the Mode A supports PUCCH format 1/1a/2/2a. The number of the repetitions supported by the Mode A is {1, 2, 4, 8}. The Mode B does not support the CSI feedback, i.e., the Mode B supports only PUCCH format 1/1a. The number of the repetitions supported by the Mode B is {4, 8, 16, 32}.

The Physical Uplink Shared Channel (PUSCH) is the same as that of the LTE, but the maximum number of resource blocks (RBs) available to be scheduled is limited to 6. The Mode A and the Mode B are supported. In the Mode A, the number of the repetitions may be {8, 16, 32}, up to 8 processes may be supported, and the speed is high. In the Mode B, a longer coverage distance is provided, and the number of repetitions may be {192, 256, 384, 512, 768, 1024, 1536, 2048}, and up to 2 uplink HARQ processes are supported.

The NB-IoT Physical Downlink Control Channel (NPDCCH) also supports up to 2048 times of repeated transmissions, and the NB-IoT Physical Uplink Shared Channel (NPUSCH) and the NB-IoT Physical Downlink Shared Channel (NPDSCH) also support up to 2048 times of the repeated transmissions.

In order to better understand the embodiments of the present disclosure, the technical problems solved by the present disclosure are described.

At present, a network/base station releases a UE to the RRC idle state through a RRC connection release message. For a scenario with a poor coverage, such as the NB-IoT or eMTC, transmission of one RRC connection release message will take about 2 s, for example, for 2048 times of retransmissions of the PDSCH, and if 2048 times of retransmissions of the PDCCH are added, then such transmission will take about 4 s. This is a big overhead for a LEO satellite network. For example, for some LEO satellites, the overhead time is about 6 s, such connection release message will occupy too much available data transmission time in the RRC connected state and affect the transmission efficiency.

If the UE is released to be in the RRC idle state based on the dataInactivityTimer, the terminal returns to the RRC idle state only when the dataInactivityTimer expires, and during running of the dataInactivityTimer, the terminal will continue to sense the network scheduling. Therefore, additional power consumption of the terminal is caused during this time, which is detrimental to an eMTC terminal and NB-IoT terminal.

Based on the above problems, the present disclosure provides a solution for RRC connection release. Time information is introduced for the RRC connection release, and the terminal device may release the RRC connection according to the time information, thereby avoiding signaling overhead caused by sending the RRC connection release message by the network device and improving data transmission efficiency.

The technical solutions of the present disclosure will be described in detail by specific embodiments below.

Figure 5:
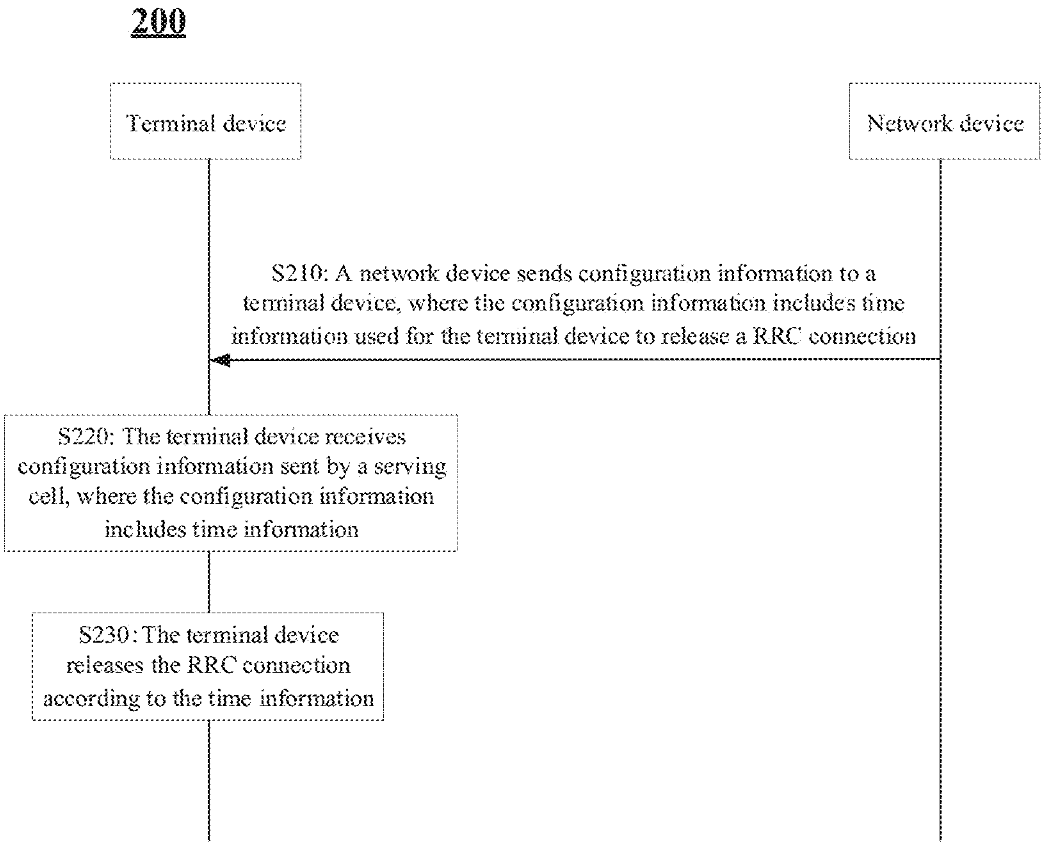
FIG. 5 is a schematic interactive flowchart of a method for wireless communication according to an embodiment of the present disclosure.

FIG. 5 is a schematic interactive flowchart of a method 200 for wireless communication according to an embodiment of the present disclosure. As illustrated in FIG. 5, the method 200 of wireless communication may include at least part of the following contents.

In S210, a network device sends configuration information to a terminal device. The configuration information includes time information, and the time information is used for the terminal device to release a RRC connection.

In S220, the terminal device receives configuration information sent by a serving cell. The configuration information includes the time information.

In S230, the terminal device releases the RRC connection according to the time information.

In some embodiments, the embodiments of the present disclosure may be applied to the NTN network, such as the LEO satellite network. Of course, the embodiments of the present disclosure may also be applied to other networks, which is not limited in the present disclosure.

In some embodiments, the embodiments of the present disclosure may be applied to the scenarios with poor coverage, such as the NB-IoT or the eMTC. Of course, the embodiments of the present disclosure may also be applied to other scenarios, which is not limited in the present disclosure.

In some embodiments, the operation in S220 may specifically include that the terminal device receives the configuration information sent by the network device in the serving cell.

In some embodiments, the time information is used for indicating a duration of a timer. The timer is started when the terminal device receives the time information, and a time when the timer expires is a time when the RRC connection is released. That is to say, the terminal device may release the RRC connection based on the timer, for example, the terminal device releases the RRC connection when the timer expires.

For example, the duration of the timer corresponds to a latest service time of the serving cell. That is to say, the time when the timer expires is the latest service time of the serving cell.

In some embodiments, the time when the timer expires corresponds to the latest service time of the serving cell. For example, the time when the timer expires is the latest service time of the serving cell. For example, the time when the timer expires is the latest moment when the satellite covers the serving cell.

In some embodiments, the time when the timer expires is earlier than the latest service time of the serving cell. For example, the time when the timer expires is earlier than the latest moment when the satellite covers the serving cell.

In some embodiments, the time when the timer expires may also be a time after the terminal device camps on the serving cell for a first duration. That is to say, the terminal device releases, based on the timer, the RRC connection after the terminal device camps on the serving cell for the first duration.

In some embodiments, the first duration is configured by the network device, or the first duration is specified in a protocol.

It is to be noted that different cells may correspond to the same first duration or different first duration, which is not limited in the present disclosure.

In some embodiments, in the case that the embodiments of the present disclosure are applied to the NTN network, the time when the timer expires is determined based on a running speed of the satellite.

In some embodiments, the time information is used for indicating an absolute time when the RRC connection is released. In some embodiments, the absolute time is a Universal Time Coordinated (UTC) time. That is to say, the network device may directly indicate the UTC time when the RRC connection is released through the time information.

In some embodiments, in the case that the time information is used for indicating the absolute time when the RRC connection is released, a time indicated by the time information corresponds to a latest service time of the serving cell. For example, the time indicated by the time information is the latest service time of the serving cell. For example, the time indicated by the time information is the latest moment when the satellite covers the serving cell.

In some embodiments, in the case that the time information is used for indicating an absolute time when the RRC connection is released, the time indicated by the time information is earlier than the latest service time of the serving cell.

In some embodiments, in the case that the time information is used for indicating an absolute time when the RRC connection is released, the time indicated by the time information may also be a time after the terminal device camps on the serving cell for a second duration. That is to say, the terminal device releases the RRC connection after the terminal device camps on the serving cell for the second duration.

In some embodiments, the second duration is configured by the network device, or the second duration is specified in the protocol.

In some embodiments, in the case that the embodiments of the present disclosure are applied to the NTN network, the time indicated by the time information is determined based on the running speed of the satellite.

For example, for the IoT-NTN scenario, the satellite network may be unable to implement the continuous coverage. The satellite cell only covers a specific location area for a duration. The latest time when the satellite covers the specific location area is notified to the terminal device, so that the IoT terminal may leave the RRC connected state when the latest time arrives. In this way, sending of the RRC release message may be reduced, and more time-frequency resources may be used for data transmission. Meanwhile, compared with the dataInactivityTimer mechanism, the terminal does not need to keep sensing for a longer time, which is beneficial to save power of the IoT terminal.

In some embodiments, the time information is carried by a system message. For example, in the case that the time information is used for indicating an absolute time when the RRC connection is released, the time information is carried by the system message.

For example, the time information may be a System Information Block (SIB) in the system message, or the time information may be an element, a field or a domain of the SIB in the system message.

In some embodiments, the time information is carried by RRC dedicated signaling. For example, in the case that the time information is used for indicating a duration of the timer, the time information is carried by the RRC dedicated signaling.

In some embodiments, the RRC dedicated signaling includes, but is not limited to, one of the following: an RRC setup message (RRCSetup), an RRC reconfiguration message (RRCReconfiguration), an RRC reestablish message (RRCReestablish), or an RRC resume message (RRCResume).

For example, the time information may be an element, a field or a domain in the RRC dedicated signaling.

In some embodiments, configuration of the time information depends on the implementation of the network.

In some embodiments, the configuration information further includes state information. The state information is used for indicating that the terminal device enters an RRC idle state after the RRC connection is released, or the state information is used for indicating that the terminal device enters an RRC inactive state after the RRC connection is released.

In some embodiments, after the terminal device releases the RRC connection according to the time information, the terminal device enters the RRC idle state or the RRC inactive state according to the state information. For example, for an eMTC terminal, after the RRC connection is released, the eMTC terminal may enter the RRC idle state or the RRC inactive state according to the state information.

In some embodiments, after the terminal device releases the RRC connection according to the time information, the terminal device enters the RRC idle state or the RRC inactive state. That is to say, when the state information is not configured, after the terminal device releases the RRC connection according to the time information, the terminal device may enter the RRC idle state or the RRC inactive state. Preferably, after the terminal device releases the RRC connection according to the time information, the terminal device enters the RRC idle state.

Figure 6:
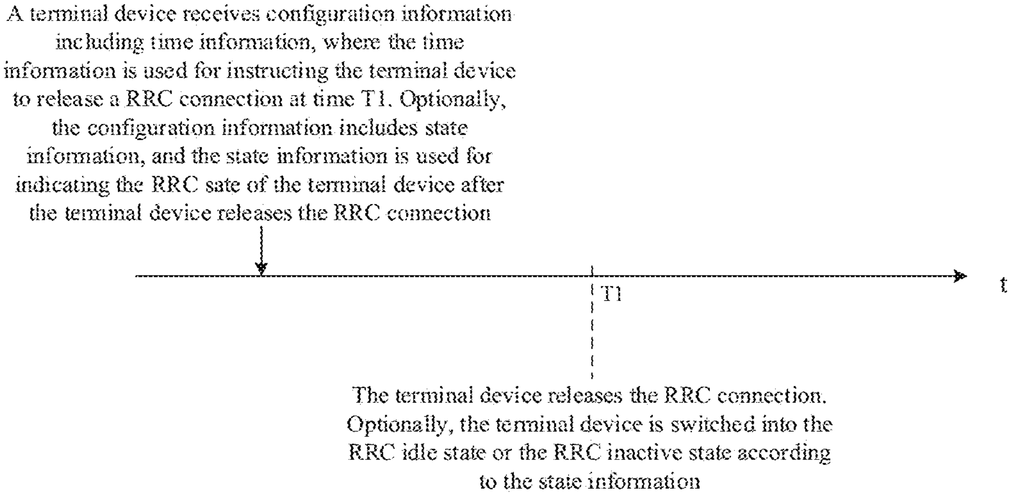
FIG. 6 is a schematic diagram of RRC connection release according to an embodiment of the present disclosure.

In an embodiment of the present disclosure, as illustrated in FIG. 6, a terminal device receives configuration information including time information, and the time information is used for instructing the terminal device to release a RRC connection at time T1. The terminal device releases the RRC connection at time T1. In an embodiment, the configuration information further includes state information. The state information is used for indicating that the terminal device enters an RRC idle state after the terminal device releases the RRC connection, or the state information is used for indicating that the terminal device enters an RRC inactive state after the terminal device releases the RRC connection. After the terminal device releases the RRC connection, the terminal device enters the RRC idle state or the RRC inactive state according to the state information.

Therefore, in the embodiments of the present disclosure, the terminal device may release the RRC connection according to the time information, thereby avoiding the signaling overhead caused by sending the RRC connection release message by the network device and improving the data transmission efficiency.

The method embodiments of the present disclosure have been described in detail above with reference to FIG. 5 to FIG. 6, and the apparatus embodiments of the present disclosure will be described in detail below with reference to FIG. 7 to FIG. 8. It should be understood that the apparatus embodiments correspond to the method embodiments, and similar descriptions may refer to the method embodiments.

Figure 7:
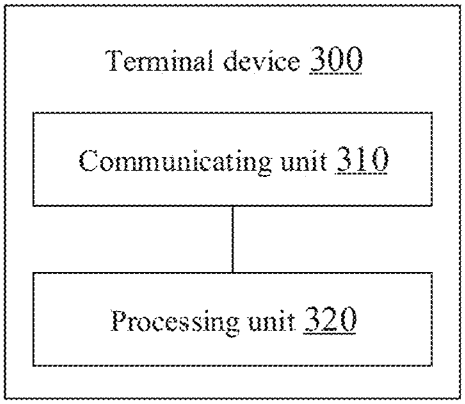
FIG. 7 is a schematic block diagram of a terminal device according to an embodiment of the present disclosure.

FIG. 7 illustrates a schematic block diagram of a terminal device 300 according to an embodiment of the present disclosure. As illustrated in FIG. 7, the terminal device 300 includes a communicating unit 310 and a processing unit 320.

The communication unit 310 is configured to receive configuration information sent by a serving cell. The configuration information includes time information.

The processing unit 320 is configured to release an RRC connection according to the time information.

In some embodiments, the time information is used for indicating a duration of a timer. The timer is started when the terminal device receives the time information, and a time when the timer expires is a time when the RRC connection is released.

In some embodiments, the time when the timer expires corresponds to a latest service time of the serving cell, or the time when the timer expires is earlier than the latest service time of the serving cell.

In some embodiments, the time information is used for indicating an absolute time when the RRC connection is released.

In some embodiments, the absolute time is an UTC time.

In some embodiments, a time indicated by the time information corresponds to a latest service time of the serving cell, or the time indicated by the time information is earlier than the latest service time of the serving cell.

In some embodiments, the time information is carried by a system message.

In some embodiments, the time information is carried by RRC dedicated signaling.

In some embodiments, the RRC dedicated signaling includes one of: an RRC setup message, an RRC reconfiguration message, an RRC reestablish message, or an RRC resume message.

In some embodiments, the configuration information further includes state information. The state information is used for indicating that the terminal device enters an RRC idle state after the RRC connection is released, or the state information is used for indicating that the terminal device enters an RRC inactive state after the RRC connection is released.

In some embodiments, after the terminal device releases the RRC connection according to the time information, the processing unit 320 is further configured to trigger the terminal device to enter the RRC idle state or the RRC inactive state according to the state information.

In some embodiments, after the terminal device releases the RRC connection according to the time information, the processing unit 320 is further configured to trigger the terminal device to enter an RRC idle state or an RRC inactive state.

In some embodiments, the communicating unit may be a communication interface or a transceiver, or an input-output interface of a communication chip or a system-on-chip. The processing unit may be one or more processors.

It is to be understood that the terminal device 300 in the embodiment of the present disclosure may correspond to the terminal device in the method embodiments of the present disclosure, and the above and other operations and/or functions of the units in the terminal device 300 are intended to implement the corresponding flow of the terminal device in the method 200 illustrated in FIG. 5, respectively, which will not be elaborated herein for brief description.

Figure 8:
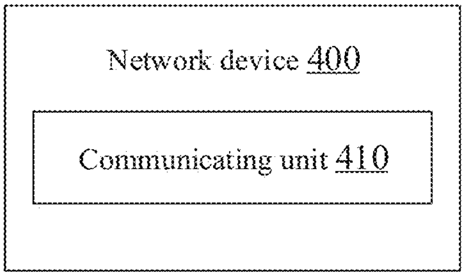
FIG. 8 is a schematic block diagram of a network device according to an embodiment of the present disclosure.

FIG. 8 illustrates a schematic block diagram of a network device 400 according to an embodiment of the present disclosure. As illustrated in FIG. 8, the network device 400 includes a communicating unit 410.

The communicating unit 410 is configured to send configuration information to a terminal device. The configuration information includes time information, and the time information is used for the terminal device to release an RRC connection.

In some embodiments, the time information is used for indicating a duration of a timer. The timer is started when the terminal device receives the time information, and a time when the timer expires is a time when the RRC connection is released.

In some embodiments, the time when the timer expires corresponds to a latest service time of a serving cell, or the time when the timer expires is earlier than the latest service time of the serving cell.

In some embodiments, the time information is used for indicating an absolute time when the RRC connection is released.

In some embodiments, the absolute time is an UTC time.

In some embodiments, a time indicated by the time information corresponds to a latest service time of the serving cell, or the time indicated by the time information is earlier than the latest service time of the serving cell.

In some embodiments, the time information is carried by a system message.

In some embodiments, the time information is carried by RRC dedicated signaling.

In some embodiments, the RRC dedicated signaling includes one of: an RRC setup message, an RRC reconfiguration message, an RRC reestablish message, or an RRC resume message.

In some embodiments, the configuration information further includes state information. The state information is used for indicating that the terminal device enters an RRC idle state after the RRC connection is released, or the state information is used for indicating that the terminal device enters an RRC inactive state after the RRC connection is released.

In some embodiments, the communicating unit may be a communication interface or a transceiver, or an input-output interface of a communication chip or a system-on-chip.

It is to be understood that the network device 400 in the embodiment of the present disclosure may correspond to the network device in the method embodiments of the present disclosure, and the above and other operations and/or functions of the units in the network device 400 are intended to implement the corresponding flow of the network device in the method 200 illustrated in FIG. 5, respectively, which will not be elaborated herein for brief description.

Figure 9:
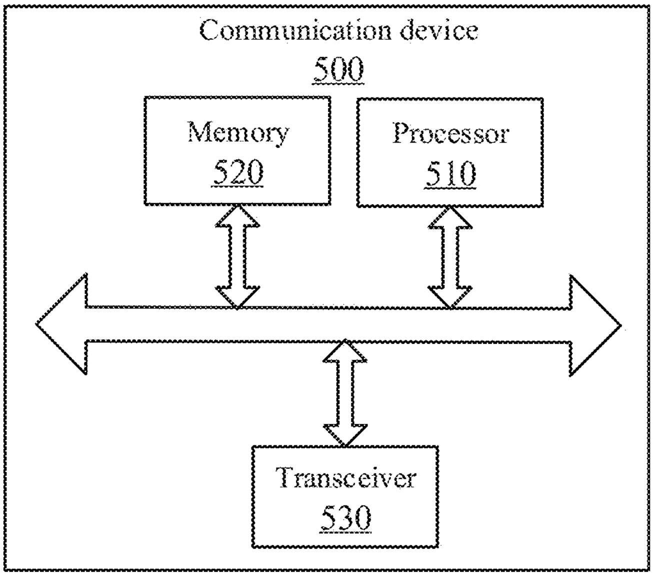
FIG. 9 is a schematic block diagram of a communication device according to an embodiment of the present disclosure.

FIG. 9 is a schematic structural diagram of a communication device 500 according to an embodiment of the present disclosure. The communication device 500 illustrated in FIG. 9 includes a processor 510. The processor 510 may invoke and run a computer program from a memory to implement the method in the embodiments of the present disclosure.

In some embodiments, as illustrated in FIG. 9, the communication device 500 may also include a memory 520. The processor 510 may invoke and run a computer program from the memory 520 to implement the method in the embodiments of the present disclosure.

The memory 520 may be a separate device from the processor 510, or the memory 520 may be integrated into the processor 510.

In some embodiments, as illustrated in FIG. 9, the communication device 500 may also include a transceiver 530.

The processor 510 may control the transceiver 530 to communicate with other devices, specifically to transmit information or data to other devices, or receive information or data transmitted by other devices.

The transceiver 530 may include a transmitter and a receiver. The transceiver 530 may further include an antenna(s), the number of which may be one or more.

In some embodiments, the communication device 500 may specifically be a network device in embodiments of the present disclosure, and the communication device 500 may implement corresponding flows implemented by the network device in each method of the embodiments of the present disclosure, which will not be elaborated herein for brief description.

In some embodiments, the communication device 500 may specifically be a terminal device in the embodiments of the present disclosure, and the communication device 500 may implement the corresponding flows implemented by the terminal device in each method of the embodiments of the present disclosure, which will not be elaborated herein for brief description.

Figure 10:
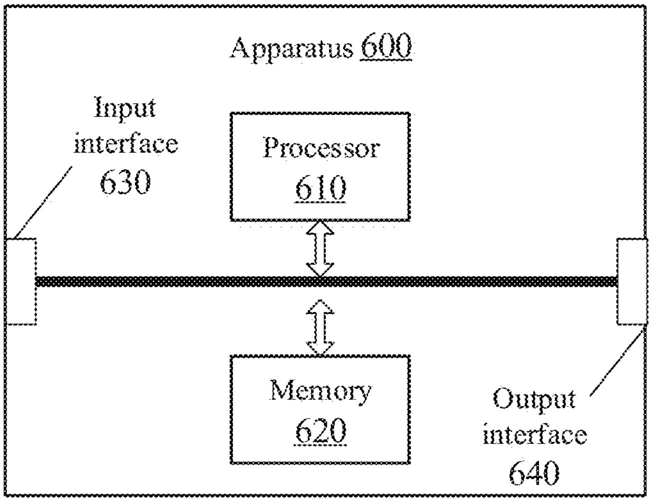
FIG. 10 is a schematic block diagram of an apparatus according to an embodiment of the present disclosure.

FIG. 10 is a schematic structural diagram of an apparatus according to an embodiment of the present disclosure. The apparatus 600 illustrated in FIG. 10 includes a processor 610. The processor 610 may invoke and run a computer program from a memory to implement the method in the embodiments of the present disclosure.

In some embodiments, as illustrated in FIG. 10, the apparatus 600 may also include a memory 620. The processor 610 may invoke and run a computer program from the memory 620 to implement the method in the embodiments of the present disclosure.

The memory 620 may be a separate device from the processor 610, or the memory 620 may be integrated into the processor 610.

In some embodiments, the apparatus 600 may also include an input interface 630. The processor 610 may control the input interface 630 to communicate with other devices or chips, in particular to obtain information or data sent by other devices or chips.

In some embodiments, the apparatus 600 may also include an output interface 640. The processor 610 may control the output interface 640 to communicate with other devices or chips, in particular to output information or data to other devices or chips.

In some embodiments, the apparatus may be applied to the network device in the embodiments of the present disclosure, and the apparatus may implement corresponding flows implemented by the network device in each method of the embodiments of the present disclosure, which will not be elaborated herein for brief description.

In some embodiments, the apparatus may be applied to the terminal device in the embodiments of the present disclosure, and the apparatus may implement corresponding flows implemented by the terminal device in each method of the embodiments of the present disclosure, which will not be elaborated herein for brief description.

In some embodiments, the apparatus mentioned in the embodiment of the present disclosure may also be a chip. For example, the apparatus may be a system-level chip, a system chip, a chip system, a system on chip, or the like.

Figure 11:
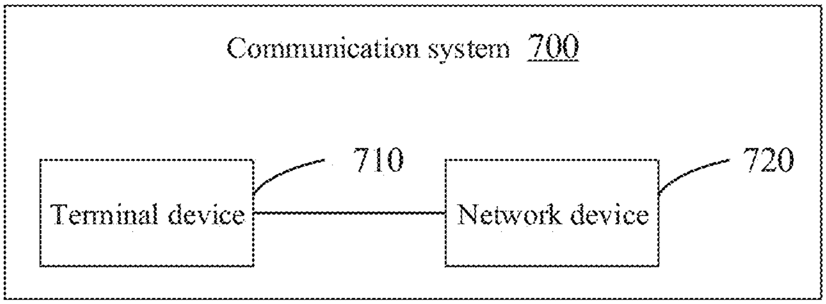
FIG. 11 is a schematic block diagram of a communication system according to an embodiment of the present disclosure.

FIG. 11 is a schematic block diagram of a communication system 700 according to an embodiment of the present application. As illustrated in FIG. 11 the communication system 700 includes a terminal device 710 and a network device 720.

The terminal device 710 may be configured to implement corresponding functions implemented by the terminal device in the above method, and the network device 720 may be configured to implement corresponding functions implemented by the network device in the above method, which will not be elaborated herein for brief description.

It is to be understood that the processor in the embodiments of the disclosure may be an integrated circuit chip and has a signal processing capacity. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logic device, a discrete gate or transistor logic device, and a discrete hardware component. Each method, operation, and logical block diagram disclosed in the embodiments of the disclosure may be implemented or executed. The universal processor may be a microprocessor, or the processor may be any conventional processor, etc. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM), and a register. The storage medium is in a memory. The processor reads information in the memory and completes the operations of the method in combination with hardware of the processor.

It can be understood that the memory in the embodiments of the disclosure may be a volatile memory or a nonvolatile memory, or may include both the volatile and nonvolatile memories. The nonvolatile memory may be a ROM, a PROM, an Erasable PROM (EPROM), an EEPROM, or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It is to be noted that the memory of a system and method described in the disclosure is intended to include, but not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM, and a DR RAM. That is, the memory in the embodiments of the disclosure is intended to include, but not limited to, memories of these and any other proper types.

The embodiments of the disclosure further provide a computer-readable storage medium, which is configured to store a computer program.

In some embodiments, the computer-readable storage medium may be applied to the network device in the embodiments of the disclosure. The computer program enables a computer to execute corresponding flows implemented by the network device in each method of the embodiments of the disclosure, which will not be elaborated here for brief description.

In some embodiments, the computer-readable storage medium may be applied to the terminal device in the embodiments of the disclosure. The computer program enables a computer to execute corresponding flows implemented by the terminal device in each method of the embodiments of the disclosure, which will not be elaborated here for brief description.

The embodiments of the disclosure further provide a computer program product, which includes computer program instructions.

In some embodiments, the computer program product may be applied to the network device in the embodiments of the disclosure. The computer program instructions enable a computer to execute corresponding flows implemented by the network device in each method of the embodiments of the disclosure, which will not be elaborated here for brief description.

In some embodiments, the computer program product may be applied to the terminal device in the embodiments of the disclosure. The computer program instructions enable a computer to execute corresponding flows implemented by the terminal device in each method of the embodiments of the disclosure, which will not be elaborated herein for brief description.

The embodiments of the disclosure further provide a computer program.

In some embodiments, the computer program may be applied to the network device in the embodiments of the disclosure. The computer program, when run on a computer, enables the computer to execute corresponding flows implemented by the network device in each method of the embodiments of the disclosure, which will not be elaborated here for brief description.

In some embodiments, the computer program may be applied to the terminal device in the embodiments of the disclosure. The computer program, when run on a computer, enables a computer to execute corresponding flows implemented by the terminal device in each method of the embodiments of the disclosure, which will not be elaborated here for brief description.

Those of ordinary skill in the art may realize that the units and algorithm operations of each example described in combination with the embodiments disclosed in the disclosure may be implemented by electronic hardware or a combination of computer software and the electronic hardware. Whether these functions are executed by hardware or software depends on specific applications and design constraints of the technical solutions. Professionals may realize the described functions for each specific application by use of different methods, but such realization shall fall within the scope of the disclosure.

Those skilled in the art may clearly learn about that specific working processes of the system, apparatus, and unit described above may refer to the corresponding processes in the method embodiments and will not be elaborated herein for convenient and brief description.

In some embodiments provided by the disclosure, it is to be understood that the disclosed system, apparatus, and method may be implemented in another manner. For example, the apparatus embodiment described above is only schematic. For example, division of the units is only logic function division, and other division manners may be adopted during practical implementation. For example, multiple units or components may be combined or integrated into another system, or some characteristics may be neglected or not executed. In addition, coupling or direct coupling or communication connection between displayed or discussed components may be indirect coupling or communication connection, implemented through some interfaces, of the apparatus or the units, and may be electrical and mechanical or adopt other forms.

The units described as separate parts may or may not be physically separated, and parts displayed as units may or may not be physical units, namely they may be located in the same place, or may be distributed to multiple network units. Part or all of the units may be selected to achieve the purposes of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for wireless communication, comprising:

receiving, by a terminal device, configuration information sent by a serving cell, wherein the configuration information comprises time information; and releasing, by a terminal device, a Radio Resource Control (RRC) connection according to the time information, wherein the time information is configured to indicate an absolute time when the RRC connection is released.

2. The method of claim 1, wherein the absolute time is a Universal Time Coordinated (UTC) time.

3. The method of claim 1, wherein a time indicated by the time information corresponds to a latest service time of the serving cell, or the time indicated by the time information is earlier than the latest service time of the serving cell.

4. The method of claim 1, wherein the time information is carried by a system message.

5. The method of claim 1, wherein the configuration information further comprises state information, wherein the state information is configured to indicate that the terminal device enters an RRC idle state after the RRC connection is released, or the state information is configured to indicate that the terminal device enters an RRC inactive state after the RRC connection is released.

6. The method of claim 1, further comprising:

entering, by the terminal device after the terminal device releases the RRC connection according to the time information, an RRC idle state or an RRC inactive state.

7. A terminal device, comprising: a processor and a memory for storing a computer program, wherein the processor is configured to call and run the computer program to cause the terminal device to:

receive configuration information sent by a serving cell, wherein the configuration information comprises time information; and release a Radio Resource Control (RRC) connection according to the time information, wherein the time information is configured to indicate an absolute time when the RRC connection is released.

8. The terminal device of claim 7, wherein the absolute time is a Universal Time Coordinated (UTC) time.

9. The terminal device of claim 7, wherein a time indicated by the time information corresponds to a latest service time of the serving cell, or the time indicated by the time information is earlier than the latest service time of the serving cell.

10. The terminal device of claim 7, wherein the time information is carried by a system message.

11. The terminal device of claim 7, wherein the configuration information further comprises state information, wherein the state information is configured to indicate that the terminal device enters an RRC idle state after the RRC connection is released, or the state information is configured to indicate that the terminal device enters an RRC inactive state after the RRC connection is released.

12. The terminal device of claim 7, wherein the processor is configured to call and run the computer program to cause the terminal device to trigger, after the terminal device releases the RRC connection according to the time information, the terminal device to enter an RRC idle state or an RRC inactive state.

13. A network device, comprising: a processor and a memory for storing a computer program, wherein the processor is configured to call and run the computer program to cause the network device to:

send configuration information to a terminal device, wherein the configuration information comprises time information used for the terminal device to release a Radio Resource Control (RRC) connection, and the time information is configured to indicate an absolute time when the RRC connection is released.

14. The network device of claim 13, wherein the absolute time is a Universal Time Coordinated (UTC) time.

15. The network device of claim 13, wherein a time indicated by the time information corresponds to a latest service time of a serving cell, or the time indicated by the time information is earlier than the latest service time of the serving cell.

16. The network device of claim 13, wherein the time information is carried by a system message.

17. The network device of claim 13, wherein the configuration information further comprises state information, wherein the state information is configured to indicate that the terminal device enters an RRC idle state after the RRC connection is released, or the state information is configured to indicate that the terminal device enters an RRC inactive state after the RRC connection is released.

* * * * *